May 28, 1957 R. L. McINNES 2,793,784
TEST PLUG FOR PRESSURE VESSELS
Filed Feb. 7, 1956 2 Sheets-Sheet 2

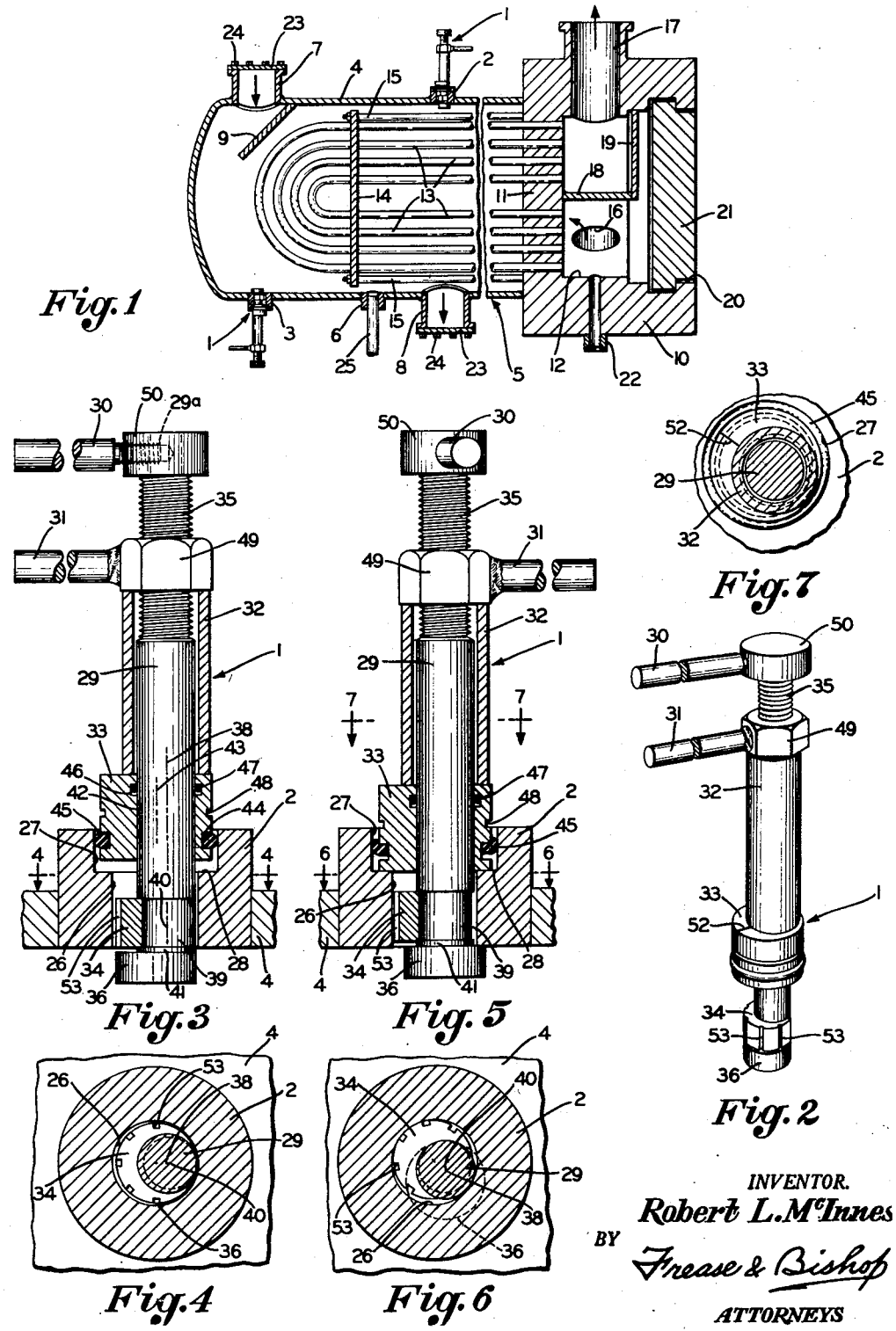

INVENTOR.
Robert L. M<sup>c</sup>Innes
BY Frease & Bishop
ATTORNEYS

United States Patent Office 2,793,784
Patented May 28, 1957

2,793,784

TEST PLUG FOR PRESSURE VESSELS

Robert L. McInnes, Massillon, Ohio, assignor to The Griscom-Russell Company, Massillon, Ohio, a corporation of Delaware Application February 7, 1956, Serial No. 564,017

17 Claims. (Cl. 220—25)

This invention relates to a test plug and more particularly it pertains to a quick opening closure for openings in a heat exchanger for testing purposes.

Heat exchangers are provided with inlets and outlets for the passage of heat exchange fluids as well as other openings for various other purposes. Such openings are usually used for the connection of instruments, such as gage glasses and pressure valves.

Most heat exchangers built in accordance with construction codes are hydrostatically tested to insure the tightness of gasketed joints and to prove the mechanical integrity of the design. A test pressure at least equal to one and one-half times the design pressure is usually required by construction codes. In order to apply the test pressures all openings must be closed off, except one opening through which the test fluid is pumped into the pressure vessel.

In the past these openings, lacking threads or other attaching means, were closed off for testing by welding a plug into the opening, or by welding lugs on the outside of the connection to which a clamp is attached for holding a gasket plate in place. After the test, the plug or lugs and gasket plate are removed and the residue of the welds removed by grinding to restore the outer surface.

Inasmuch as the foregoing procedure for closing openings in a heat exchanger or pressure vessel was time-consuming and wasteful of materials, it was desirable to provide a substitute means for closing the openings of the heat exchangers for pressure testing.

I have discovered a self-sealing device for closing openings in a heat exchanger which is quickly and easily installed and removed manually without the use of tools. The device is adapted to operate at all testing pressures for heat exchangers.

Accordingly, it is a general object of this invention to provide a test plug for openings in a heat exchanger that is quickly and easily installed and removed.

It is another object of this invention to provide a test plug for the openings in a heat exchanger that is self-sealing.

Another object of this invention is to provide a test plug for the openings in a heat exchanger that is manually operated without the aid of tools.

Finally, it is an object of this invention to provide an improved test plug for heat exchangers which incorporates the foregoing desiderata in an inexpensive manner.

These and other objects apparent to those skilled in the art from the foregoing description and claims may be obtained, the stated results achieved and described difficulties overcome by the discoveries, principles, apparatus, parts, combinations, subcombinations and elements which comprise the present invention, the nature of which is set forth in the following statement, preferred embodiments of which—illustrative of the best modes in which applicant has contemplated applying the principles—are set forth in the following description, and which are particularly and distinctly pointed out and set forth in the appended claims forming part thereof.

The nature of the improved test plug construction of the present invention may be stated in general terms as including a shaft having a threaded end and having a lug at the other end, the lug having a lateral dimension greater than the diameter of the shaft and smaller than the diameter of the opening in a pressure vessel. In addition, a necked portion is provided on the shaft adjacent the lug, and a crescent-shaped snap ring is rotatably mounted on the necked portion having a diameter less than that of the opening. An annular member is rotatably mounted on the shaft between the necked portion and the threaded end, the member having a portion of diameter smaller than that of the pressure-vessel opening and having a circumferential groove around said portion with a resilient gasket partially seated therein for engagement with the opening, and a nut mounted on the threaded end of the shaft for tightening the assembly in the opening.

The preferred embodiments of the invention are illustrated, by way of example, in the accompanying drawings wherein:

Fig. 1 is a vertical sectional view through a heat exchanger showing one embodiment of the present invention installed therein;

Fig. 2 is a perspective view of the device;

Fig. 3 is a vertical sectional view showing the device partially installed in an opening in a heat exchanger;

Fig. 4 is a horizontal sectional view taken on the line 4—4 of Fig. 3;

Fig. 5 is a vertical sectional view showing the device fully installed in the opening;

Fig. 6 is a horizontal sectional view taken on the line 6—6 of Fig. 5;

Fig. 7 is a horizontal sectional view taken on the line 7—7 of Fig. 5;

Similar numerals refer to similar parts throughout the various figures of the drawings.

Figures 8, 10:
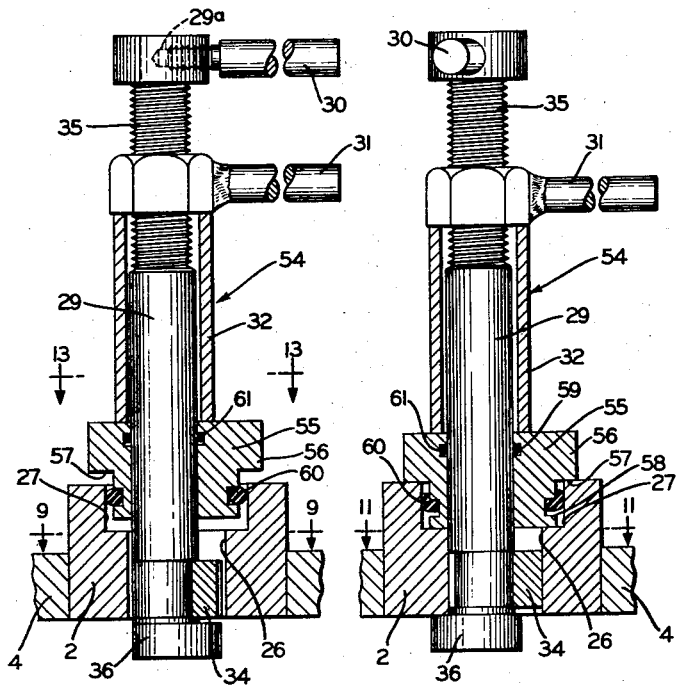
Fig. 8 is a vertical sectional view of a second embodiment partially installed in an opening in a heat exchanger.
Fig. 10 is a vertical sectional view taken on line 10—10 of Fig. 11 showing the device fully installed in the opening.

In Fig. 1 one embodiment of the present invention is generally indicated at 1 installed within similar openings or sockets 2 and 3 in the shell 4 of a heat exchanger generally indicated at 5. The shell 4 also includes a drain opening or connection 6 as well as inlet 7 and outlet 8. Below the inlet 7 is a baffle plate 9 inclined from the inner surface of the shell 4.

The heat exchanger 5 also includes a head member 10 and a tube sheet 11 which form a head chamber 12. A plurality or bundle of U-shaped heat exchanger tubes 13 having ends extending through and seated in the tube sheet 11 communicate with the head chamber 12. The tubes 13 are supported in the shell 4 by a support plate 14 connected to the tube sheet by similar tie rods 15.

The head member 10 is provided with an inlet 16 and an outlet 17. The chamber 12 is divided into fluid-tight compartments by partition plates 18 and 19. The open end 20 of the head member 10 is closed by a removable head cover 21. Moreover, the head member 10 includes an opening or socket 22.

To test the heat exchanger 5 hydrostatically all but one of the openings and inlets are closed in a fluid-tight manner to seal the shell 4 during the test. In addition, the inlet 7 and outlet 8 are provided with plates 23 which are secured in place by bolts 24 in a fluid-tight manner. For the smaller openings or sockets 2 and 3 the test plugs 1 are readily installed as shown in Fig. 1. With all openings in the shell 4 closed, a water line 25 leading from a pressure pump (not shown) is connected to the opening 6 and the shell 4 is filled with water. Thereafter the pressure is applied to the water to test the connections between the tubes 13 and the tube sheet 11 hydrostatically.

In a similar manner the head member 10 is tested by closing the inlet 16 and the outlet 17 as well as other openings, such as the connection 22, and the seal between the head cover 21 and the open end 20 of the head member. The head member 21 is sealed in place in a suitable manner.

As shown in Figs. 3 and 5 the sockets 2, 3 and 22 have a bore 26 and an enlarged or countersunk portion 27 thereof, forming a shoulder 28 with the bore 26 facing the outer end. In Figs. 3 and 5 the test plug 1 is inserted into the bore 26.

The test plug 1 includes an elongated shaft 29, a positioning handle 30, an adjusting handle 31, a spacer 32, an annular gland 33, and a snap ring or member 34. The shaft 29 has a threaded upper end portion 35, and the lower end is provided with a lug 36 which is preferably round. The diameter of the lug 36 is greater than that of the shaft and less than that of the bore 26. One side of the lug 36 is aligned with one side of the shaft 29 so that the center of the lug is offset to the left of the axis 38 of the shaft 29 as shown in Fig. 3. Hence, the lug 36 is eccentric of the shaft 29 with a crescent portion of the lug overlapping the lower end of the shaft.

The snap ring or member 34 is crescent-shaped and is rotatably mounted on a reduced or necked portion 39 of the shaft 29. As shown in Figs. 3 and 4, one side of the necked portion 39 is aligned with the aligned sides of the lug 36 and shaft 29, and the center 40 of the necked portion is offset to the right of the axis 38 of the shaft 29. Between the necked portion 39 and the lug 36 is a shaft portion 41 having a diameter equal to the shaft 29. The portion 41 serves as a spacer between the ring 34 and the lug 36 so that upon insertion of the plug 1 into the socket 2 and rotation of the shaft 29, the lug clears the inner end of the socket. The diameter of the ring 34 is greater than that of the shaft 29 and smaller than that of the bore 26, and preferably equal to the diameter of the lug 36.

The annular gland 33 has a diameter greater than that of the bore 26 and smaller than that of the countersunk portion 27. Like the ring 34, the gland 36 is rotatably mounted on the shaft. Moreover, the gland 33 is movable longitudinally of the shaft 29. The gland 33 has a bore 42 the center of which is aligned with the axis of the shaft 29 and offset from the axis 43 of the gland. The outer surface of the gland 33 includes a circumferential groove 44 in which is mounted an O-ring 45 of resilient or elastic material. As shown in Fig. 3 the ring 45 is seated in the groove 44 and its outer surface engages the wall of the countersunk portion 27 of the bore 26 when inserted therein.

In addition, the gland 33 includes a circumferential groove 46 around the bore 42 and an O-ring 47 of elastic material is disposed therein to provide a fluid seal between the shaft 29 and the gland 33. The gland 33 is also provided with a circumferential groove 48 on the outer surface above the groove 44. When the fixture or plug 1 is properly inserted in the socket 2, the groove 48 is aligned with the outer end of the socket as shown in Fig. 5.

The spacer 32 is mounted on the shaft 29 between the gland 33 and the adjusting handle 31. The spacer 32 is a cyclindrical member the lower end of which abuts the upper end of the gland 33 and the upper end of which abuts a nut 49 on the threaded portion 35 to which the handle 31 is attached.

The positioning handle 30 is fixedly mounted on the upper end of the shaft 29 by an annular member 50 that is seated over the upper end of the shaft 29. The end of the handle 30 extends through the member 50 and engages an aligned aperture 29a in the shaft 29.

The fixture or plug 1 is manually inserted into the socket 2 with the various parts disposed as shown in Fig. 3; that is, the lug 36 and the ring 34 are aligned for insertion into the bore 26. In addition, the adjusting handle 31 is in a withdrawn position on the threaded portion 35 so that the gland 33 may be inserted into the countersunk portion 27 with the ring 45 contacting the walls of the countersunk portion. Thus, in the position shown in Fig. 3 the upper side of the lug 36 is clear of the inner end of the socket 22 by a distance preferably equal to the thickness of the shaft portion 41. Also, the snap ring 34 is entirely disposed within the bore 26. Moreover, the positioning handle 30 is aligned with a mark 52 on the upper end surface of the gland 33 as shown in Fig. 2.

After insertion, as shown in Fig. 5, the handle 30 is rotated until the shaft 29 contacts the wall of the bore 26. The handle 30 may be rotated either clockwise or counterclockwise. Assuming the handle 30 is rotated counterclockwise the lug 36 rotates from the position of alignment with the snap ring 34 and the bore 26 (Fig. 3) to the position shown in Fig. 5. In the latter position a portion of the lug 36 overlaps the inner end of the socket 2 (Figs. 5 and 6). Thus, the plug 1 is clamped in place against the hydrostatic pressure created within the shell 4 during testing.

During the rotation of the lug 36 to the position shown in Fig. 5, the portion of the shaft 29 between the necked portion and the shoulder 28 moves into contact with the wall of the bore 26. Continued rotation of the shaft 29 drives the snap ring 34 against the side of the bore 26 diametrically opposite the contact point of the shaft. During the rotation of the shaft 29, the axis 40 of the necked portion 39 moves with respect to the axis 38 of the shaft 29 (see Figs. 4 and 6). Further rotation of the shaft 29 is inhibited by the camming and binding action between the parts thereby limiting the rotation of the lug 36 to less than 180° counterclockwise from the initial position of Figs. 2, 3 and 4.

Thereafter the handle 31 is rotated clockwise until the lower end of the gland 33 is seated against the shoulder 28, pulling the shaft 29 longitudinally upwardly as shown in Fig. 5 until the overlapping portion of the lug 36 engages the corresponding portion of the end of the socket 2. In the latter position the plug 1 is sealed in place within the socket 2.

When the shell 4 is tested hydrostatically by a suitable fluid, such as water, any fluid that may enter the bore 26 will be stopped at the O-rings 45 and 47. The O-ring 45 will be distorted between the socket 2 and the gland 33, as shown in Fig. 5. The grooves 53 on the outer surface of the ring 34 enable fluid movement into and out of the bore 26.

Figure 12:
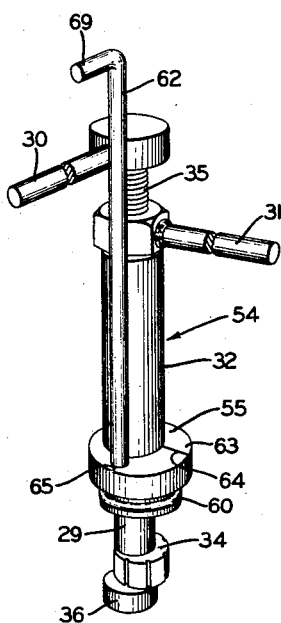
Fig. 12 is a perspective view of the second embodiment in the locked position.

In addition to the embodiment of the invention shown in Figs. 1 to 7, a second embodiment 54 is shown in Figs. 8, 10 and 12. The second embodiment 54 is similar to the first in all respects except that the second embodiment is provided with a gland 55 of different construction from that of the gland 33. The gland 55 is provided with a peripheral flange 56 which forms a shoulder 57 that overlaps the upper end of the socket 2. As shown in Fig. 10, when the test plug 54 is completely installed, the shoulder 57 engages the outer end of the socket 2 surrounding the countersunk portion 27. In addition, the gland 55 is provided with a peripheral groove 58 in its outer surface and a groove 59 surrounding the shaft 29. The O-rings 60 and 61 are seated in the grooves 58 and 59, respectively. In addition, the test plug 54 is provided with a safety pin 62 as shown in Fig. 12.

As in the test plug 1 of Figs. 1–7, the test plug 54 also includes the elongated shaft 29, the positioning handle 30, the adjusting handle 31, the spacer 32, and the snap ring 34. The shaft 29 has a threaded upper end portion 35 and the lower end is provided with the lug 36.

Figure 13:
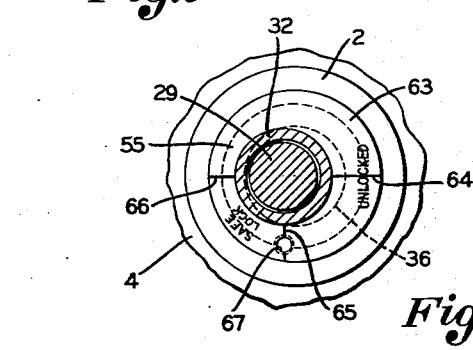
Fig. 13 is a horizontal sectional view taken on the line 13—13 of Fig. 8.

The gland 55 has an upper surface 63 (Figs. 12 and 13) in which a number of marks are inscribed including a mark 64, a mark 65, and a mark 66, which denote respectively the "unlocked" position, the position of minimum lock, and the position of maximum lock of the positioning handle 30. Between the marks 65 and 66 is the "safe lock" position. When the test plug 54 is inserted into the socket 2 the positioning handle 30 is aligned with the mark 64 so that the central or larger portion of the crescent-shaped lug 36 and the gland 55 are aligned with each other.

Figure 9:
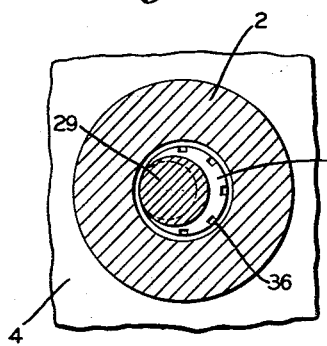
Fig. 9 is a horizontal sectional view taken on the line 9—9 of Fig. 8.
Figure 11:
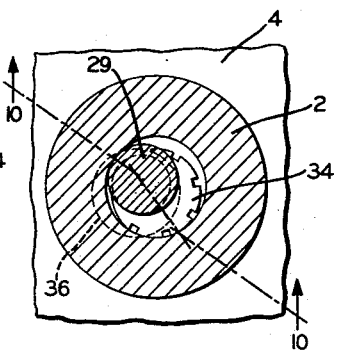
Fig. 11 is a horizontal sectional view taken on the line 11—11 of Fig. 10.
Figure 14:
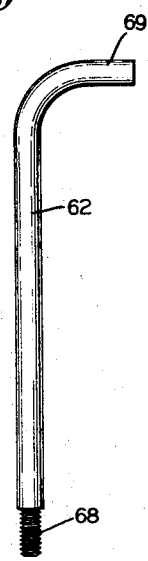
Fig. 14 is an elevational view of the safety pin portion of the second embodiment.

As was set forth with respect to the test plug 1 of the invention, the positioning handle 30 may be rotated either clockwise or counterclockwise. However, the preferred direction of rotation is clockwise, or to the left from the position shown in Fig. 8 to that of Fig. 10. Upon rotating the positioning handle 30 in the clockwise direction from its position of alignment with the mark 64, the snap ring 34 and the shaft 29 expand radially from their compact position (Fig. 8) to the expanded position (Fig. 10) and engage approximate diametrically opposite sides of the bore 26 of the socket 2. The initial and final positions of the lug 36, the snap ring 34 and the shaft 29 are shown, respectively, in Figs. 9 and 11.

In the locked position the handle 30 must be disposed between the marks 65 and 66 (Figs. 12 and 13) which denote the positions of minimum and maximum overlap of the lug 36 with the inner end of the socket 2. Thereafter, the adjusting handle 31 is rotated clockwise in order to draw the upper surface of the lug 36 into engagement with the lower end of the socket 2 as well as to seat the gland 55 into the countersunk portion 27 of the bore 26. During the clockwise rotation of the adjusting handle 31 on the threaded end portion 35 of the shaft 29 frictional forces between spacer 32, the gland 55, and the shaft 29 urge the shaft 29 to rotate slightly in the same direction if not restrained. Hence, by rotating the positioning handle 30 clockwise, rather than counterclockwise, the subsequent clockwise rotation of the adjusting handle 31 urges the positioning handle 30 to retain its location in the "safe lock" position between the marks 65 and 66. In addition, the upper surface 63 of the gland 55 at the mark 65 is provided with a threaded aperture 67 adapted to receive a lower threaded end 68 of the pin 62.

To prevent the handle from rotating counterclockwise beyond the mark 65 the safety pin 62, having an outturned upper end 69, is inserted into the threaded aperture 67 from which it extends upwardly above the handle 30.

The present invention provides a new and useful test plug for heat exchangers by which heat exchangers or other pressure vessels may be subjected to hydrostatic pressures before shipping the heat exchanger to a customer. The test plug when properly installed is self-sealing. It is quickly attached and removed from an outlet. Moreover, it may be used repeatedly and is not expended with repeated usage.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example and the scope of the present invention is not limited to the exact details of construction shown.

Having now described the features, construction and principles of the invention, the characteristic of the test plug construction, and the advantageous, new and useful results provided; the new and useful discoveries, principles, parts, elements, combinations, subcombinations, structures and arrangements and mechanical equivalents thereof obvious to those skilled in the art, are set forth in the appended claims.

I claim:

1. A test plug for sealing an aperture in the wall of a pressure-vessel, including a plug shaft, a laterally extending lug on one end of the shaft having a lateral dimension smaller than that of the aperture, a gland sleeve slideable and eccentrically journaled on the shaft, the shaft having a necked portion of smaller diameter than the shaft intermediate the lug and gland, a crescent-shaped member rotatably mounted on the shaft necked portion, the member having an outer diameter smaller than that of the aperture, O-ring means mounted on the gland, and means on the shaft for slideably moving the gland toward the crescent-shaped member and lug.

2. The construction defined in claim 1 in which the shaft necked portion is located adjacent the lug.

3. The construction defined in claim 1 in which the means for moving the gland includes a nut adjustable on the shaft.

4. The construction defined in claim 1 in which the shaft is provided with handle means for inserting the shaft, the lug, the crescent-shaped member, and the sleeve in an aperture to be sealed, and for rotating the lug with respect to the aperture and the crescent-shaped member; and said gland-moving means being adapted to move the gland toward the lug and the clamp pressure-vessel wall portions surrounding the aperture between the lug and the gland.

5. The construction defined in claim 1 in which indicator means are provided on the shaft and the gland which are aligned for insertion of the plug in an aperture to be sealed, and in which the shaft and gland indicator means are rotated relative to one another to establish lug engagement with a pressure-vessel wall when the test plug is inserted in a wall aperture to be sealed.

6. The construction defined in claim 5 in which other indicator means are provided on the gland which may be aligned with said shaft indicator means upon relative rotation between the shaft and gland to engage a test plug in an aperture to be sealed, and in which lug engagement with a pressure-vessel wall in a safe manner is established when said other indicator means and said shaft indicator means are aligned.

7. The construction defined in claim 6 in which disengageable locking means is provided between the shaft and the gland preventing relative unlocking rotation between the shaft and gland after a locked position of the parts has been established.

8. The construction defined in claim 1 in which O-ring sealing means is provided between the shaft and gland.

9. A test plug for sealing an aperture in the wall of a pressure-vessel, including a plug shaft, a round lug eccentrically mounted on one end of the shaft having a diameter greater than the shaft diameter and smaller than that of the aperture, a gland sleeve slideable and eccentrically journaled on the shaft, the shaft having a necked portion of smaller diameter than the shaft, the axis of the necked portion being eccentric to the shaft axis, a member having an inner circular surface journaled on the shaft necked portion, the member having an outer diameter eccentric to its inner surface and smaller than that of the aperture, the member being located intermediate the lug and gland, the gland being provided with a portion adapted for engagement with a pressure-vessel wall portion when slideably moved along the shaft, O-ring means on the gland for sealing the gland in an aperture in which the test plug is inserted, and means on the shaft for slideably moving the gland toward the lug to clamp the test plug to a pressure-vessel wall between the gland and lug when inserted in a wall aperture to be sealed.

10. A test plug for sealing an aperture in the wall of a pressure-vessel, including a plug shaft, a laterally extending lug on one end of the shaft having a lateral dimension smaller than that of the aperture, a gland sleeve slideable and eccentrically journaled on the shaft, the shaft having a necked portion of smaller diameter than the shaft, a member having an inner circular surface journaled on the shaft necked portion, the member having an outer diameter eccentric to its inner surface and smaller than that of the aperture, the member being located intermediate the lug and gland, the gland being provided with a portion adapted for engagement with a pressure-vessel wall portion when slideably moved along the shaft, O-ring means on the gland for sealing the gland in an aperture in which the test plug is inserted, and means on the shaft for slideably moving the gland toward the lug to clamp the test plug to a pressure-vessel wall between the gland and lug when inserted in a wall aperture to be sealed.

11. The construction defined in claim 10 in which the end of the gland nearest the lug constitutes the portion adapted for engagement with a pressure-vessel wall portion.

12. The construction defined in claim 10 in which the gland is provided with an annular shoulder, and in which the shoulder comprises the portion of the gland adapted for engagement with a pressure-vessel wall portion.

13. The construction defined in claim 10 in which the axis of the necked portion is eccentric to the shaft axis, and in which the axis of the necked portion is offset from that of the shaft in a different direction from the offset of the lateral extent of the lug from the axis of the shaft.

14. Test plug closure construction for sealing an aperture in the wall of a pressure-vessel, including a vessel wall portion having an aperture, an enlarged countersunk shoulder portion formed in the vessel wall surrounding and communicating with the aperture, a plug shaft extending through the countersunk portion and aperture, a laterally extending lug on one end of the shaft having a lateral dimension smaller than that of the aperture movable to a position engaging the wall beneath the aperture, a gland sleeve slideable and eccentrically journaled on the shaft, a member having an inner circular surface journaled on the shaft, the member having an outer diameter eccentric to its inner surface and smaller than that of the aperture, the member being located in the aperture and intermediate the lug and the gland, at least a portion of the gland being received in the enlarged countersunk pressure-vessel wall portion, O-ring means sealing the joint between the gland and the countersunk pressure-vessel wall portion, means for turning the shaft when inserted in the aperture relative thereto to engage the lug with the vessel wall portion beneath the aperture, and means on the shaft for moving the sleeve into the vessel wall countersunk portion and for maintaining the same therein when the lug is engaged with the vessel wall.

15. The construction defined in claim 14 in which the shaft is provided with means for moving the member and the shaft relative to the aperture and to each other to laterally clamp the member and shaft against the wall of the aperture.

16. Test plug closure construction for sealing an aperture in the wall of a pressure vessel, including a vessel wall portion provided with an aperture, the aperture-forming wall portion being provided with a countersunk annular shoulder intermediate the inner and outer cylindrical ends of the aperture and forming an enlarged aperture portion between the shoulder and outer end of the aperture and a smaller aperture portion between the shoulder and inner end of the aperture, a cylindrical gland sleeve seated against a portion of the vessel wall and extending within the enlarged aperture portion, O-ring means sealing the joint between the gland sleeve and the enlarged aperture portion, shaft means extending through the gland sleeve and aperture and eccentrically located with respect to each, laterally extending lug means on one end of the shaft means, the shaft means being axially slidable and rotatable with respect to the gland sleeve, the laterally extending portion of the lug means being movable when the shaft means is rotated with respect to the gland sleeve between a position radially within the circumference of the smaller aperture portion and a second position extending radially beyond the circumference of the smaller aperture portion, means on the shaft for slidably moving the lug means toward the gland sleeve when the latter is seated against a vessel wall portion, and said lug means when in said second position engaging the vessel wall at the inner end of the aperture when the lug means is moved by said moving means to clamp the vessel wall between the gland and lug means to seal the aperture.

17. The construction defined in claim 16 in which O-ring sealing means is provided for the slidable and rotatable joint between the shaft means and gland.

References Cited in the file of this patent

UNITED STATES PATENTS

| Number | Name | Date |
|---|---|---|
| 63,706 | Crompton | Apr. 9, 1867 |
| 1,296,275 | Firth | Mar. 4, 1919 |
| 1,684,983 | Clark | Sept. 18, 1928 |
| 2,581,536 | Johns | Jan. 8, 1952 |
| 2,581,537 | Maisch | Jan. 8, 1952 |
| 2,683,499 | De Croes | July 13, 1954 |
| 2,705,574 | Schoessow et al. | Apr. 5, 1955 |